United States Patent Office 3,823,226
Patented July 9, 1974

3,823,226
PREPARATION OF ALUMINUM HYDRIDE
COMPOSITIONS
Frank M. Brower, Midland, Barbara H. Phillips, Freeland, Norman E. Matzek, Midland, Arthur L. Daniels, Coleman, and Donald F. Musinski, Bay City, Mich., assignors to The Dow Chemical Company, Midland, Mich.
Filed Mar. 8, 1962, Ser. No. 179,510
Int. Cl. B01j 17/00; C01b 6/00
U.S. Cl. 423—645
20 Claims This invention pertains to a process for the preparation of particular types of aluminum hydride compositions.

While aluminum hydride has been reported in literature for a considerable time, the aluminum hydride has been most generally produced as a solvated product with an ether and used as such. Recently methods for the preparation of a particular form of aluminum hydride have been developed. This type of aluminum hydride is also obtained by desolvation of the known aluminum hydride etherates. This aluminum hydride (hereinafter referred to as gamma-aluminum hydride) is relatively unstable. The material decomposes to aluminum and hydrogen upon standing at room temperature and thus greatly limits its utility. The gamma-aluminum hydride may be converted to a crystalline material having an hexagonal crystal structure (hereinafter referred to as alpha-aluminum hydride) and a rhombohedral crystalline material (hereinafter referred to as beta-aluminum hydride) which are stable. Aluminum hydride in these particular solid forms can be used successfully as a constituent in rocket propellants. These compositions are described in more detail in concurrently filed patent application Ser. No. 179,509 of which Norman E. Matzek and Donald F. Musinski of instant application are coinventors.

It is an object of this invention to provide a method for the preparation of alpha-aluminum hydride and beta-aluminum hydride. A further object is to provide a process for the conversion of gamma-aluminum hydride to more stable forms of aluminum hydride or stabilization of the gamma-aluminum hydride.

The above and other objects are attained according to the invention, which comprises intermixing gamma-aluminum hydride with a complex hydride, such as an alkali metal aluminum hydride or an alkali metal borohydride as lithium aluminum hydride, sodium aluminum hydride, lithium borohydride, sodium borohydride or mixtures thereof in proportions such that at least one-tenth of a mole of the complex hydride is present for each mole of the gamma-aluminum hydride. After the gamma-aluminum hydride is thus intermixed with the complex hydride, the composition is heated at a temperature of above 40° C. to convert the gamma-aluminum hydride to the more stable form of aluminum hydride. The stable aluminum hydride is then recovered from the heated mixture, such as by use of a selective solvent or fractional crystallization.

The critical step in obtaining the conversion of the gamma-aluminum hydride to the more stable form of aluminum hydride is heating the gamma-aluminum hydride in the presence of the complex hydride at a temperature above 40° C. Generally a temperature in the range of 55° C. to 75° C. is preferred. A temperature of at least 40° C. is necessary in order to effect the desired reaction and may be as high as 140° C. However, as the temperature is increased above the preferred range, a certain amount of decomposition of the product to aluminum and hydrogen is obtained. Thus, temperatures above the 140° C. are seldom used.

Generally in heating the gamma-aluminum hydride in presence of the complex hydride the gamma-aluminum hydride is first converted to beta-aluminum hydride and then to alpha-aluminum hydride. The alpha-aluminum hydride is the final product and is the most stable. The time required to effect the reaction varies with the temperature employed and complex hydride used. At temperatures of around 40° C. to 50° C. the reaction is fairly slow and it may require at least 24 hours or more to obtain substantially complete conversion of the gamma-aluminum hydride to the alpha form. Generally a reaction time in the range of from 1 to 2 hours for the formation of beta-aluminum hydride and of from 4 to 12 hours for the formation of alpha-aluminum hydride is employed for temperatures in the preferred range. For temperatures above the preferred range but below 120° C., the time of contact is considerably shortened and is in the range of ¼ to 3 hours to obtain the alpha-form. Above 120° C. to 140° C. the mixture may be contacted only for a period of 15 minutes or so to substantially completely convert the gamma-aluminum hydride to the alpha-form. The heat treatment step is carried out preferably at a reduced pressure, but the use of a reduced pressure is not necessary.

The amount of the complex hydride present during the heat treatment period must be at least $\frac{1}{10}$ mole of complex hydride for each mole of gamma-aluminum hydride. Generally from $\frac{1}{5}$ to 1 mole of the complex hydride is used for each mole of gamma-aluminum hydride present. Larger amounts of the complex hydride may be used but very little benefit is gained. Since eventually the complex hydride must be removed from the final reaction product, unduly large amounts are avoided.

It is advantageous to use freshly prepared gamma-aluminum hydride, especially if the gamma-aluminum hydride is obtained by the desolvation of an etherate. When gamma-aluminum hydride is allowed to set for appreciable time, for example over 2 days, it will undergo decomposition and aging such that the heat treatment process described above will be substantially ineffective.

While gamma-aluminum hydride prepared by any process may be used, it is often most convenient to obtain the gamma-aluminum hydride by desolvation of etherates. The method for the preparation of the aluminum hydride solvated product or etherate is not critical. Aluminum hydride etherates prepared by the reaction of a chloride compound with an alkali metal or alkaline metal aluminum hydrides are operative and may be employed. The solvated aluminum hydride may be preferably prepared by reacting aluminum chloride with lithium aluminum hydride. Stoichiometric amounts of lithium aluminum hydride may be used or the required excess for both the desolvating action and heat treatment steps may be added at this time. The reaction of the aluminum chloride with lithium aluminum hydride is generally effected in an aliphatic ether medium. The aluminum hydride thus formed then reacts with the ether solvent to form a solvated aluminum hydride or etherate. Usually, an excess of ether is used so that after the etherate formation enough unsolvated ether remains to serve as a reaction medium. The aliphatic (including cycloaliphatic) ethers having from 2 to 8 carbon atoms may be used. Illustrative examples of these ethers are the alkyl ethers; ethylene glycol dialkyl ethers and diethylene glycol dialkyl ethers having methyl and ethyl alkyl radicals; and cycloaliphatic ethers such as 1,4-dioxane, tetrahydrofuran, alkyl tetrahydrofuran such as methyl tetrahydrofuran, and tetrahydropyran. Alkyl ethers are preferred.

The reaction of aluminum chloride with lithium aluminum hydride proceeds rapidly and is generally substantially completed in three to ten minutes. The reaction mixture is subjected to a reduced pressure to vaporize the ether at temperatures below 40° C., after the lithium chloride formed by the reaction is removed, such as by filtration. A temperature below 40° C. is necessary to prevent the decomposition of the product when in contact with solvent ether. Generally after evaporation of the solvent, the resulting product obtained may be heated for a short period of time from ½ to 1 hour to ensure complete ether removal and desolvation before heat treating the product to obtain the stable crystalline aluminum hydride. The desolvated product which contains the required excess of lithium aluminum hydride is then subjected to the heat treatment described above. After the heat treatment, the desired aluminum hydride product may be most conveniently separated from the excess lithium aluminum hydride by use of a solvent to preferentially dissolve or leach the lithium aluminum hydride from the mixture. Since lithium aluminum hydride is soluble in alkyl ethers and the alpha-aluminum hydride product obtained is not, an alkyl ether is thus often used to wash the lithium aluminum hydride from the alpha-aluminum hydride product.

In the heat treatment step, the conversion of the gamma-aluminum hydride to alpha-aluminum hydride may be enhanced by employing a mixture of an alkali metal aluminum hydride and an alkali metal borohydride. By the employment of the mixture, the temperature at which the reaction may be effected is lowered about 5 to 10 degrees so that the conversion to the desired aluminum hydride composition can be obtained more easily with less decomposition of the product to aluminum and hydrogen. The optimum results are obtained generally when the borohydride content is maintained below ¼ mole per mole of the gamma-aluminum hydride present. Also the presence of borohydride enhances the formation of beta-aluminum hydride as an intermediate. With the borohydride present, a major portion of the gamma-aluminum hydride is converted to beta-aluminum hydride prior to its conversion to alpha-aluminum hydride. Without the borohydride, the rate of conversion generally is such that only a small portion of the product undergoing heat treatment is beta-aluminum hydride at any time.

To illustrate the invention, aluminum hydride etherate was prepared by reacting diethyl ether solutions of lithium aluminum hydride and aluminum chloride in an inert atmosphere. The solutions were intermixed in a flask at room temperature and atmospheric pressure in an amount to give 0.104 mole of lithium aluminum hydride and 0.026 mole of aluminum chloride. The reaction proceeded rapidly and was completed in approximately 2 minutes. The lithium chloride which precipitated was immediately filtered off. Since an excess of lithium aluminum hydried had been originally used, the filtrate after removal of the lithium chloride was heated to a temperature in the range of 35° C. at about 10 millimeters of mercury absolute to vaporize the solvent. Upon vaporization of the diethyl ether, the etherate, a white solid, was obtained which was then heated for about 1 hour. A sample was taken and upon analysis was found to contain about 80 weight percent of gamma-aluminum hydride and about 20 weight percent of lithium aluminum hydride.

After the sample was taken the product was further heated for about 5 hours at 75° C. under a reduced pressure. The final product was washed with diethyl ether and the lithium aluminum hydride present was thus removed. The washed product was analyzed by X-ray and found it contained approximately 95 percent of the hexagonal crystalline alpha-aluminum hydride. The remainder of the sample comprised pure aluminum and some unconverted aluminum hydride.

The run described above was repeated except that after the initial reaction of aluminum chloride with lithium aluminum hydride the solution was filtered to remove the lithium chloride and the filtrate discharged into a diethyl ether solution containing 0.04 mole of lithium borohydride. The solutions were intermixed and then heated under reduced pressure as described above at a temperature of 35° C. to remove the solvent. After the solvent was removed, the product was maintained at a temperature in the range of 65° C. for 6 hours. Samples were periodically taken and analyzed by X-ray. Based upon the X-ray data, the aluminum hydride in the samples was found to be present in the different forms in about the following amounts:

| Sample No. | Time, hrs. | Alpha-AlH₃ | Beta-AlH₃ | Gamma-AlH₃ |
|---|---|---|---|---|
| 1 | 0 | 0 | 0 | 0 |
| 2 | 1 | 0 | 80 | 20 |
| 3 | 2 | 10 | 80 | 10 |
| 4 | 3 | 35 | 60 | 5 |
| 5 | 4 | 55 | 40 | <5 |
| 6 | 6 | 75 | 25 | 0 |

Similar results to those above were obtained when sodium aluminum hydride and sodium borohydride and mixtures thereof were used in place of lithium aluminum hydride or lithium borohydride in the heat treatment step.

What is claimed is:

1. A process for the preparation of an alpha-aluminum hydride product having a hexagonal crystalline structure from gamma-aluminum hydride which comprises intermixing, in an inert atmosphere, the gamma-aluminum hydride with a complex hydride selected from the group consisting of lithium aluminum hydride, sodium aluminum hydride, sodium borohydride, lithium borohydride and mixtures thereof, in an amount of at least ¹/₁₀ mole of the complex hydride per mole of the gamma-aluminum hydride, heating the resulting mixture at a temperature in the range of 40° to 140° C. for from ¼ to 24 hours to convert the gamma-aluminum hydride to the hexagonal crystalline structure alpha-aluminum hydride, and recovering the alpha-aluminum hydride from the reaction mixture.

2. A process according to Claim 1 wherein from ⅙ to 1 mole of the complex hydride is intermixed with the gamma-aluminum hydride and the mixture is heated at a temperature in the range of 55° to 75° C. for from 4 to 12 hours.

3. A process according to Claim 2 wherein the complex hydride is lithium aluminum hydride.

4. A process according to Claim 2 wherein the complex hydride is sodium aluminum hydride.

5. A process according to Claim 2 wherein the complex hydride is lithium borohydride.

6. A process according to Claim 2 wherein the complex hydride is a mixture of lithium aluminum hydride and lithium borohydride.

7. A process according to Claim 2 wherein the complex hydride is a mixture of lithium aluminum hydride and sodium borohydride.

8. A process according to Claim 2 wherein the complex hydride is a mixture of sodium aluminum hydride and lithium borohydride.

9. A process for the preparation of a beta-aluminum hydride product having a rhombohedral crystalline structure from gamma-aluminum hydride which comprises intermixing, in an inert atmosphere, the gamma-aluminum hydride with a mixture of a complex aluminum hydride selected from the group consisting of lithium aluminum hydride and sodium aluminum hydride and a complex borohydride selected from the group consisting of sodium borohydride, lithium borohydride in an amount of at least ¹/₁₀ mole of the mixture of the complex aluminum hydride and the complex borohydride per mole of the gamma-aluminum hydride, heating the resulting mixture at a temperature in the range of 55° C. to 75° C. for from 1 to 2 hours to convert the gamma-aluminum hydride to the rhombohedral crystalline structure beta-aluminum hydride, and recovering the beta-aluminum hydride from the reaction mixture.

10. A process according to Claim 9 wherein from ⅙ to 1 mole of the mixture of the complex aluminum hydride and of the complex borohydride is intermixed with the gamma-aluminum hydride with the complex borohydride content being not greater than ¼ mole per mole of the gamma-aluminum hydride.

11. In a process for the preparation of an aluminum hydride wherein the aluminum hydride is prepared from an aluminum hydride etherate by desolvating the etherate, the step of stabilizing the aluminum hydride from decomposition to its elements, which comprises intermixing in an inert atmosphere the aluminum hydride with a complex hydride selected from the group consisting of lithium aluminum hydride, sodium aluminum hydride, sodium borohydride, lithium borohydride and mixtures thereof, in an amount of at least ⅒ mole of the complex hydride per mole of the aluminum hydride, heating the resulting mixture at a temperature in the range of 40° to 140° C. for at least ¼ hour to stabilize the aluminum hydride from decomposition to its elements and separating the stabilized aluminum hydride from the complex hydride.

12. A process according to Claim 11 wherein the complex hydride is intermixed with the freshly prepared aluminum hydride in an amount of from ⅙ to 1 mole per mole of the aluminum hydride and the mixture is heated from 4 to 12 hours at a temperature in the range of 55° to 75° C.

13. A process for the preparation of an alpha-aluminum hydride product having a hexagonal crystalline structure from aluminum hydride etherate which comprises desolvating the aluminum hydride etherate to thereby obtain a gamma-aluminum hydride, intermixing in an inert atmosphere the gamma-aluminum hydride with a complex hydride selected from the group consisting of lithium aluminum hydride, sodium aluminum hydride, sodium borohydride, lithium borohydride and mixtures thereof, in an amount of at least ⅒ mole of the complex hydride per mole of the gamma-aluminum hydride, heating the resulting mixture at a temperautre in the range of 40° to 140° C. for from ¼ to 24 hours to convert the gamma-aluminum hydride to the hexagonal crystalline structure alpha-aluminum hydride, and recovering the alpha-aluminum hydride from the reaction mixture.

14. A process according to Claim 13 wherein the complex hydride is lithium aluminum hydride and it is intermixed in an amount of from ⅙ to 1 mole per mole of gamma-aluminum hydride and the mixture is heated at a temperature in the range of 55° to 75° C. for from 4 to 12 hours.

15. A process for the preparation of an alhpha-aluminum hydride product having a hexagonal crystalline structure from aluminum hydride etherate, which comprises intermixing an aluminum hydride etherate with a complex hydride selected from the group consisting of lithium aluminum hydride, sodium aluminum hydride, lithium borohydride, sodium borohydride, and mixtures thereof in an aliphatic ether solvent having from 3 to 8 carbon atoms, the amount of said complex hydride being at least ⅒ mole per mole of said aluminum hydride etherate heating the resulting mixture at a temperature below 40° C. and at a reduced pressure to vaporize substantially all of the ether solvent from the mixture, subsequently heating the substantially solvent-free mixture at a temperature in the range of 55° to 75° C. for from ¼ to 1 hour to vaporize any remaining ether and to thereby convert the aluminum hydride etherate to a gamma-aluminum hydride product, subsequently heating the gamma-aluminum hydride and the complex hydride mixture at a temperature in the range of 40° to 140° C. for from ¼ to 24 hours to convert the gamma-aluminum hydride to the hexagonal crystalline structure alpha-aluminum hydride, and recovering the alpha-aluminum hydride from the resulting mixture.

16. A process according to Claim 15 wherein the complex hydride is lithium aluminum hydride and the lithium aluminum hydride is intermixed with the aluminum hydride etherate in an amount of from ⅙ to 1 mole per mole of the etherate.

17. A process for the preparation of an alpha-aluminum hydride product having a hexagonal crystalline structure, which comprises intermixing, in an ether solvent having from 3 to 8 carbon atoms, aluminum chloride with a stoichiometric excess of lithium aluminum hydride such that at least ⅒ mole of the lithium aluminum hydride is present per mole of aluminum hydride formed by the reaction to thereby react the aluminum chloride with the lithium aluminum hydride to form an aluminum hydride etherate and lithium chloride, removing the lithium chloride, vaporizing the alkyl ether from the lithium chloride-free reaction mixture at a temperature below 40° C., heating the resulting solvent-free reaction mixture at a temperature in the range of 40° to 140° C. for from ¼ to 24 hours to convert the reaction mixture to alpha-aluminum hydride having hexagonal crystalline structure, and recovering the alpha-aluminum hydride product from the reaction mixture.

18. A process according to Claim 17 wherein the lithium aluminum hydride is intermixed with the aluminum chloride in a stoichiometric excess such that from ⅙ to 1 mole of unreacted lithium aluminum hydride is present per mole of aluminum hydride in the reaction mixture.

19. A process for the preparation of an alpha-aluminum hydride product having a hexagonal crystalline structure from gamma-aluminum hydride, which comprises heating a mixture of gamma-aluminum hydride and a complex hydride selected from the group consisting of lithium aluminum hydride, sodium aluminum hydride, sodium borohydride, lithium borohydride and mixtures thereof at a temperature in the range of 40° C. to 140° C. for from ¼ to 24 hours to convert the gamma-aluminum hydride to the hexagonal crystalline structure alpha-aluminum hydride, said complex hydride being present in an amount of at least ⅒ mole of the complex hydride per mole of gamma-aluminum hydride.

20. A process according to Claim 17 wherein the solvent is diethyl ether and the solvent-free mixture is heated from 4 to 12 hours at a temperature in the range of 55° to 75° C.

References Cited

UNITED STATES PATENTS 2,567,972   9/1951   Schlesinger et al. _____ 423—644

LELAND A. SEBASTIAN, Primary Examiner

U.S. Cl. X.R.

23—300, 305; 149—109